(12) United States Patent
Li et al.

(10) Patent No.: US 9,553,895 B2
(45) Date of Patent: Jan. 24, 2017

(54) SYSTEM AND METHOD FOR BUILDING INTELLIGENT AND DISTRIBUTED L2-L7 UNIFIED THREAT MANAGEMENT INFRASTRUCTURE FOR IPV4 AND IPV6 ENVIRONMENTS

(71) Applicant: Blue Coat Systems, Inc., Sunnyvale, CA (US)

(72) Inventors: Qing Li, Cupertino, CA (US); Ronald Andrew Frederick, Mountain View, CA (US); Thomas A. Clare, Traverse City, MI (US)

(73) Assignee: Symantec Corporation, Mountain View, CA (US)

( * ) Notice: Subject to any disclaimer, the term of this patent is extended or adjusted under 35 U.S.C. 154(b) by 52 days.

(21) Appl. No.: 14/472,256

(22) Filed: Aug. 28, 2014

(65) Prior Publication Data

US 2014/0373129 A1   Dec. 18, 2014

Related U.S. Application Data

(62) Division of application No. 13/116,760, filed on May 26, 2011, now Pat. No. 8,839,404.

(51) Int. Cl.
 *H04L 29/06* (2006.01)
 *H04L 29/08* (2006.01)
(52) U.S. Cl.
 CPC .......... *H04L 63/20* (2013.01); *H04L 63/0218* (2013.01); *H04L 63/0245* (2013.01); *H04L 63/145* (2013.01); *H04L 67/327* (2013.01)

(58) Field of Classification Search
 CPC ..................................................... H04L 63/20
 See application file for complete search history.

(56) References Cited

U.S. PATENT DOCUMENTS 7,028,337 B2 * 4/2006 Murakawa .......... H04L 63/0272
 726/15
7,224,699 B2 * 5/2007 Zhang ................. H04L 63/0272
 370/352

(Continued)

OTHER PUBLICATIONS

Barford et al.; A signal analysis of network traffic anomalies; Published in: Proceeding IMW '02 Proceedings of the 2nd ACM SIGCOMM Workshop on Internet measurment; 2002; pp. 71-82; ACM Digital Library.*

(Continued)

*Primary Examiner* — Bradley Holder
(74) *Attorney, Agent, or Firm* — Baker Botts L.L.P.

(57) ABSTRACT

A security gateway appliance is configured to evaluate network traffic according to security rules that classify traffic flows according to specifically identified application programs responsible for producing and/or consuming the network traffic and to enforce policies in accordance with network traffic classifications. The appliance includes an on-box anti-virus/anti-malware engine, on-box data loss prevention engine and on-box authentication engine. One or more of these engines is informed by an on-box dynamic real tie rating system that allows for determined levels of scrutiny to be paid to the network traffic. Security gateways of this type can be clustered together to provide a set of resources for one or more networks, and in some instances as the backbone of a cloud-based service.

10 Claims, 5 Drawing Sheets

(56) References Cited

U.S. PATENT DOCUMENTS

| | | | | |
|---|---|---|---|---|
| 7,652,984 B1* | 1/2010 | Kotecha | H04L 12/4633 | 370/217 |
| 7,930,750 B1* | 4/2011 | Gauvin | H04L 63/1416 | 709/223 |
| 8,266,694 B1* | 9/2012 | Roy | H04L 63/1441 | 713/151 |
| 8,315,246 B2* | 11/2012 | Shatzkamer | H04L 63/08 | 370/328 |
| 8,370,936 B2* | 2/2013 | Zuk | H04L 63/0254 | 713/151 |
| 8,566,920 B2* | 10/2013 | Ylonen | H04L 12/4604 | 726/13 |
| 2001/0020273 A1* | 9/2001 | Murakawa | H04L 63/0272 | 726/15 |
| 2003/0110379 A1* | 6/2003 | Ylonen | H04L 12/4604 | 713/164 |
| 2003/0154399 A1* | 8/2003 | Zuk | H04L 63/0254 | 726/11 |
| 2006/0104233 A1* | 5/2006 | Zhang | H04L 63/0272 | 370/328 |
| 2007/0268888 A1* | 11/2007 | Shatzkamer | H04L 63/08 | 370/352 |
| 2010/0024026 A1* | 1/2010 | Ylonen | H04L 12/4604 | 726/12 |
| 2010/0125899 A1* | 5/2010 | Tinnakornsrisuphap | H04L 63/101 | 726/12 |
| 2010/0318685 A1* | 12/2010 | Kraus | G07C 9/00944 | 709/249 |
| 2011/0113250 A1* | 5/2011 | Li | H04L 47/2491 | 713/171 |

OTHER PUBLICATIONS

Mah; An empirical model of HTTP network traffic; Published in: INFOCOM '97. Sixteenth Annual Joint Conference of the IEEE Computer and Communications Societies. Driving the Information Revolution., Proceedings IEEE (vol. 2 ); Date of Conference: Apr. 7-12, 1997; pp. 592-600 vol. 2; IEEE Xplore.*

* cited by examiner

SYSTEM AND METHOD FOR BUILDING INTELLIGENT AND DISTRIBUTED L2-L7 UNIFIED THREAT MANAGEMENT INFRASTRUCTURE FOR IPV4 AND IPV6 ENVIRONMENTS

RELATED APPLICATIONS

This application is a DIVISIONAL of and incorporates by reference U.S. application Ser. No. 13/116,760, filed May 26, 2011.

FIELD OF THE INVENTION

The present invention relates to methods and systems which integrate firewall and unified threat management (UTM) infrastructures with application proxy technology to provide a unified solution for IPv4 and IPv6 environments.

BACKGROUND

Many application programs make use of the Internet Protocol (IP) version 4 (IPv.4) and IP version 6 (IPv.6) when being accessed across local and wide area networks as well as across the Internet. While the use of IP has advantages, its widespread use exposes enterprise and other networks to certain risks. Similar threats are faced with traffic running over other protocols (e.g., file transfer protocol (FTP), simple mail transfer protocol (SMTP), etc.), and so companies must be vigilant in regulating traffic passing into and out of their networks, irrespective of origin and with due attention paid to the content, or payload, of data packets in addition to packet header information.

Traditionally, firewalls have been used to regulate enterprise traffic at the packet level. First-generation firewalls were essentially packet filters that acted by inspecting individual packets as they passed between different computer systems. If a packet matched one of the packet filter's rules, the packet filter took the corresponding action prescribed by that rule. Such packet filters typically operated at a relatively low levels of the transmission control protocol/Internet protocol (TCP/IP) stack (typically OSI Layer 2 to Layer 4 (L2-L4)) and firewall administrators defined the matching criteria and corresponding rules for how to treat packets upon a match. These packet filters generally were not able to take action according to whether individual packets were part of existing traffic flows. That is, packet filters did not maintain any information concerning connection state and instead operated only on information contained within the individual packets themselves.

Second-generation firewalls, on the other hand, are "stateful" filters, which maintain records of connections passing through the firewall. Any existing network connection can be described by several properties, including source and destination IP address, UDP or TCP ports, and the current stage of the connection's lifetime (including session initiation, handshaking, data transfer, or completion connection). Because stateful firewalls maintain context about active sessions, they can use that state information to speed up packet processing. If a packet does not match an existing connection, it will be evaluated according to the firewall's rule set for new connections. If a packet matches an existing connection based on comparison with the firewall's state table, it will be processed in accordance with rules for that connection. Examples of L3-L4 firewall rules are:
   if protocol==TCP, port==xxxx, Block Traffic
   if protocol==IPv4, Source IP=a.b.c.d, Allow Traffic As the examples illustrate, a traditional firewall can identify only protocol values, L3 addresses, L4 port information, and enforce coarse actions such as block or allow on the traffic. A slightly more intelligent firewall may be able to identify traffic at higher OSI layers, but cannot associate, for example, a specific user with an application. Thus, even the more intelligent firewall might only permit use of rules such as:
   if Source IP=a.b.c.d, protocol==HTTP, Block Traffic
   The possible actions that can be performed on the identified traffic are limited to, for example, block, allow or bandwidth management.

Another form of network device used to regulate traffic in computer networks is a proxy server (often referred to simply as a proxy or sometimes as a secure web gateway (SWG)). Generally, a proxy is a computer system or application program that resides logically between one or more clients and one or more content sources (e.g., servers), and which terminates connections between the clients and the content sources. In response to a client request, for example for a specified service, file, connection, web page, or other resource, the proxy provides the requested content directly (e.g., if it stores a local copy of same) or connects to the specified server and makes the request on behalf of the client. In this latter case, the proxy may retain a copy of the requested content so as to service later requests for that content directly, without having to connect to the server.

Proxies can filter traffic based on many packet attributes, such as source IP address and/or port, and destination IP address and/or port. In addition, proxies can filter traffic based on destination service, such as hypertext transfer protocol (HTTP), file transfer protocol (FTP), Common Internet File System (CIFS), etc., and on other attributes. As these devices operate up to the application layer, i.e., at OSI layers L3-L7, they may inspect the contents of the traffic, blocking what a network administrator views as inappropriate content. In addition proxies can associate a user with a specific traffic flow, and modify the traffic content. Examples of L3-L7 proxy rules are:
   If User==John Doe, protocol==IPv4+HTTP, time==12:00 AM, Rewrite the HTTP Protocol Header
   If Source IP=a.b.c.d, protocol==CIFS, Block CIFS Write Operation Although proxies and firewalls may appear to overlap in terms of operating on information present at common OSI layers, e.g., L3-L4, the two are fundamentally different. For example, a firewall does not terminate connections of L4 (or other) protocols such as TCP or HTTP, while a proxy terminates all connections of all L4 and application protocols. Indeed, a proxy may even initiate its own connections if the connections satisfy the proxy's policies. Because of these and other differences, firewalls and proxies do not traditionally operate in parallel within the same appliance or solution.

SUMMARY OF THE INVENTION

A security gateway configured in accordance with an embodiment of the present invention is configured to evaluate network traffic according to security rules that classify traffic flows according to specifically identified application programs responsible for producing and/or consuming the network traffic and to enforce policies in accordance with network traffic classifications. The policies may be associated with one or more connection management actions, for example load balancing, traffic shaping, and quality of service actions, and may be enforced at any or all of OSI layers L3-L7. The policies may be written in natural language expressions.

The security gateway may be further configured to provide real-time ratings and protection against undesired web content for a network associated with the security gateway, to evaluate the network traffic for potential data loss from a network associated with the security gateway, and to provide application filtering and controls while enforcing quality of service. All of these features may be included "on-box", within a single appliance configured to scan inbound traffic for a network associated with the security gateway for viruses and malware engine, and to scan outbound traffic from the network for data leaks, without diverting the traffic off of the appliance. Any initial classifications may be updated by consuming additional data bytes of the traffic until a definitive application type is identified. In this way, an L2-L4 firewall engine may be updated dynamically, to optimize processing of future traffic.

A further embodiment of a security gateway may be configured to evaluate network traffic according to a dynamic real time rating scheme that facilitates categorization of content represented in the traffic and, based on results of the dynamic real time rating apply a determined level of anti-virus, anti-malware scanning to the traffic. Alternatively, or in addition, the security gateway may be configured to log user access histories within a network associated with the security gateway and, according to analyses of said logged user access histories, apply determined levels of data loss prevention scrutiny to traffic associated with recognized users. Still further, the security gateway may be configured with a policy engine to inform a traffic classification engine that evaluates network traffic to handle that traffic in accordance with policies written at an application level and expressed in natural language by passing traffic to appropriate application proxies and to update, dynamically, an L2-L4 firewall engine in accordance with new traffic classifications based on extended observations of the network traffic which result in updated classification decisions. The security gateway may include an anti-virus/anti-malware engine, a data loss prevention engine and an authentication engine, as well as a dynamic real time rating facility that informs the anti-virus/anti-malware engine so that a determined level of scanning can be performed on the traffic.

Still other embodiments of the invention provide a cluster of security gateways made up of individual appliances communicatively coupled to one another in a full mesh configuration, each configured to evaluate network traffic according to security rules that classify traffic flows according to specifically identified application programs responsible for producing and/or consuming the network traffic and to enforce policies in accordance with network traffic classifications. The individual security gateway appliances may be configured to exchange information with peer security gateway appliances, said information including some or all of processed traffic flow information, resource utilization levels, application recognition capabilities, anti-virus/anti-malware database information, and data loss prevention signature information. The individual security gateway appliances may hand off asymmetrically routed traffic to peer ones of the security gateway appliances which first encountered the traffic.

A further embodiment of the invention provides for establishing a peering relationship among two or more security gateway appliances so as to define a cluster of peered security gateway appliances, each security gateway appliance of the cluster exchanging traffic flow information describing actions to be taken with respect to network traffic of the traffic flows received at the member network security gateway appliances of the clusters. The network traffic received at a first one of the peered network security appliances may be processed in accordance with traffic flow policies received from a second one of the peered network security appliances.

A further embodiment of the invention includes a network security gateway appliance associated with an enterprise or other network which appliance is communicatively coupled to a cluster of security gateway appliances instantiated as a cloud-based service, wherein said cluster of security gateway appliances is configured to provide specified services to said enterprise or other network via said security gateway appliance, said services comprising some or all of data loss protection, anti-virus/anti-malware scanning and policy enforcement, dynamic real time rating of content sources, security services, network acceleration, and other policy based services. Such a cloud-based service may be further configured to dynamically update the network security gateway appliance with revised security and access policies for traffic directed to and from the enterprise or other network. Alternatively or in addition, the system may include a plurality of security gateway appliances, each deployed within or associated with individual networks or segments thereof and configured to act as intrusion detection sensors for their respective networks or segments, each security gateway appliance communicatively coupled to a central security gateway controller that is configured to compute an overall threat map for the system and, based on the overall threat map to determine a set of active defenses for the system and deploy to each of the plurality of security gateway appliances a set of dynamic polices to implement the set of active defenses.

BRIEF DESCRIPTION OF THE DRAWINGS

The present invention is illustrated by way of example, and not limitation, in the figures of the accompanying drawings in which.

DETAILED DESCRIPTION

Described herein are systems and methods which integrate firewall and UTM infrastructures with application proxy technology to provide a unified solution for IPv4 and IPv6 environments. In one embodiment, functionality provided by the present invention is instantiated in a next-generation security gateway (NGSW) that can classify traffic flows according to specific named applications (e.g., those applications responsible for producing and/or consuming the network traffic). This information is then used to enforce L3-L7 policies (e.g., as defined by system administrators). The defined policies may be written and expressed in natural language, for example:

If Application==QQLive, User==John Doe, time==9:00 AM, Block file transfer within QQLive In general, the policies may be instantiations of security rules for an enterprise or other network communicatively coupled to the NGSW and may be associated with one or more connection management actions such as load balancing, traffic shaping, and quality of service actions. The policies may be enforced at any or all of OSI layers L3-L7.

By combining firewall/UTM infrastructures with application proxy technology the NGSW is able to provide real-time ratings and protection against undesired web content for enterprise and other networks. The NGSW also affords data loss protection, provides application filtering and controls while enforcing quality of service, and has the ability to perform intrusion detection, stateful firewalling, and private secure network tunneling. In the following description, the NGSW is described as being composed of multiple modules that encompass various networking and security technologies, however, in other embodiments some or all of these various functionalities may be embodied in more or fewer modules than are discussed herein.

The present invention also includes, in some embodiments, the use of multiple NGSWs to form a cluster. The members of such a cluster are enabled to communicate with one other in full-mesh (or other) connectivity, exchange capabilities and running state information about one another and collaboratively offer security services across a large geographical or logical area.

The present NGSW may further be configured with "on-box" anti-virus and anti-malware, and data leak prevention engines. By "on-box" we mean that the functions provided by these engines are included in the hardware, software and/or firmware of a single appliance. In some instances, as discussed further below, the services may be made available from a "cloud-based" set of appliances, but the functionality is still considered to be "on-box" because each appliance includes the same capabilities (although the anti-virus and/or anti-malware signatures or other data files may be provided from third parties). Contents handled by the NGSW can be scanned by the on-box anti-virus and anti-malware engine, and outbound traffic can be scanned by the on-box data leak prevention engine. The NGSW may also include an on-box authentication engine that can associate traffic with specific users in authentication realms such as NTLM, LDAP, RADIUS and Kerberos.

Traditional stateful firewalls cannot perform any firewall functions when processed traffic flows are asymmetrically routed. In other words, if the processed traffic is bidirectional, but the transmitting and receiving paths are different, then traditional stateful firewalls cannot process the traffic. As indicated above, however, NGSWs configured in accordance with the present invention may be arranged into a full-mesh cluster, and together the clustered NGSW appliances may work together to enforce security policies even though asymmetric traffic routing occurs. Techniques for deploying such clusters are explained in co-pending U.S. patent application Ser. No. 11/834,576, assigned to the assignee of the present invention and incorporated herein by reference.

When so clustered, each NGSW in the cluster may advertise its capabilities, such as data leak prevention, virus and spyware scanning depth, types of application inspection, etc., as well as its load and utilization information to its peers. In some cases (e.g., where the NGSW includes a cache) each NGSW may also advertise some or all of its content (i.e., content which it has cached) to its peers such that these cached contents can be either pushed or delivered on demand to others of the NGSWs in the cluster. Because these contents will have been scanned for viruses, malware, etc., they are known by the other NGSWs (and by extension, clients of the NGSWs) to be safe to retrieve. NGSW clusters may also be instantiated with a control feedback loop that includes intrusion detection system sensors. As threats are identified, new dynamic runtime policies can be pushed to each NGSW in the cluster. An NGSW cluster can be deployed to form the cloud-based environment alluded to above.

The NGSW appliance can perform load balancing functions based on L7 information. For example, If Application==Skype, User==John Dole, time==9:00 AM-3:00 PM EST, Redirect Traffic to NGSW Appliance X Further, the NGSW appliance may be configured to communicate with a dynamic content rating service provider to offer real-time URL and content categorization and rating services. Predefined access or security policies for an enterprise network or other instantiation operating behind the NGSW can then be enforced according to the classified category and rating results.

Figure 1:
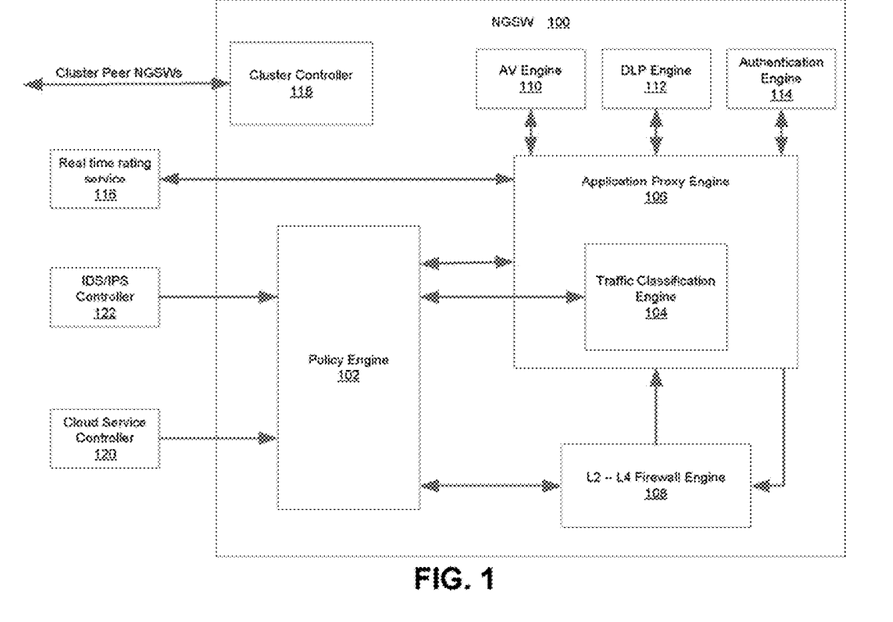
FIG. 1 is a block diagram illustrating an example of an architecture of a next-generation security gateway (NGSW) appliance according to an embodiment of the present invention.

With the above in mind, we turn now to FIG. 1, which is a block diagram illustrating the overall architecture of an NGSW appliance 100 according to an embodiment of the present invention. NGSW 100 includes a policy engine 102 configured to understand policy gestures from OSI L2-L7. Policy engine 102 communicates with a traffic classification engine 104, application proxy engines 106 and an L2-L4 firewall engine 108. The traffic classification engine 104 may be an integral part of the application proxy engines, or a separate classification engine.

In a traditional SWG, an application proxy configures the system to intercept traffic on certain well-known L4 protocol ports, for example, TCP port 80 for HTTP traffic, or port 443 for HTTPS traffic. However, the actual traffic carried inside, for example, TCP port 80 may not be HTTP traffic. Thus, there are many issues that can arise when the connection has been intercepted. For example, if there is no known proxy within the SWG that is capable of processing the traffic, the traffic may sometimes be tunneled to its ultimate destination over TCP, but in other cases the traffic connection may be broken. Further, if the traffic is obfuscated such that it may take many exchanges to identify and the traditional SWG only process a limited amount of data before handing the traffic off to a possible tunneling mechanism, the security services offered by the SWG can be circumvented.

The NGSW, on the other hand, is configured to classify traffic continuously and not just using a limited number of bytes. In other words, traffic classification engine 104 is configured to classify traffic observed by the NGSW 100, and change or update any initial classifications by consuming additional data bytes until a definitive application type is identified. At that time, the defined policies that apply to that application type will be enforced by the policy engine 102, for example by directing the traffic classification engine to hand off the traffic to an appropriate application proxy configured to enforce the applicable policies. As these policies are activated, the application proxies engine 106 may update the L2-L4 firewall engine 108 dynamically, to optimize processing of future traffic of the just-identified application type.

The dynamic traffic classification provided in accordance with the present invention avoids the need for an administrator to continually and manually update the NGSW. Further, this functionality allows for the use of natural language policy rules based on application names rather than just protocol types and/or port numbers. For example, policy rules written in the style of if user==USER1, traffic==APPLICATION(a); Deny (where USER1 is identifying information associated with a particular user or user station and APPLICATION(a) is the name of a particular application program that generates and/or consumes the associated traffic) may now be used. Other examples may include if Facebook application==Game(x); Block where a particular application (Game(x)) of a particular web site (e.g., Facebook™) is called out for special treatment. Note, in the foregoing examples, the emphasis has been on highlighting certain new elements of policy rules that allow for the use of application identification information rather than simply protocol identification information and in practice the actual policy rules may be longer and contain more complex constructions. The simple constructions shown herein are meant to be illustrative and are not necessarily intended for specific implementations.

Figure 2:
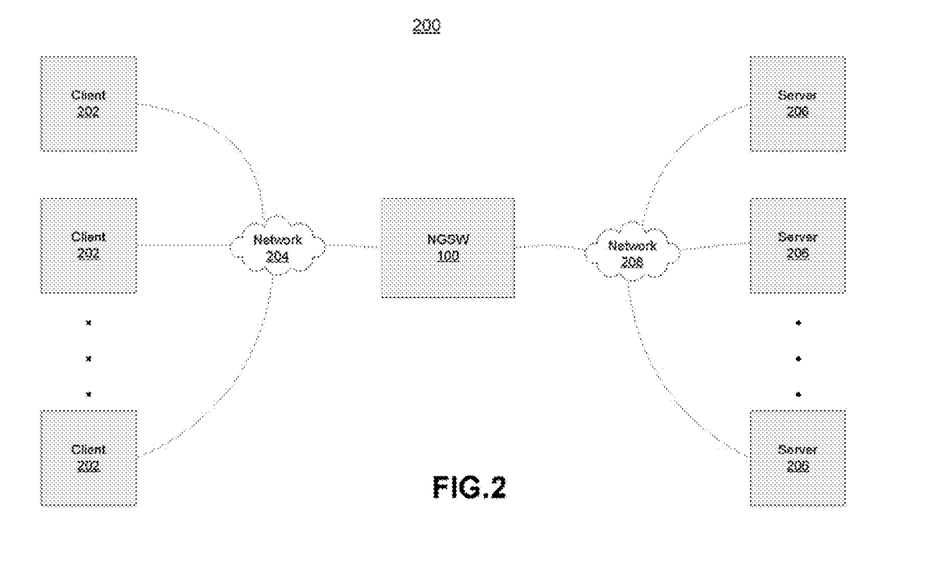
FIG. 2 is a block diagram of one embodiment of a network environment utilizing a network device such as an NGSW. in accordance with an embodiment of the present invention.

Before describing further details of the NGSW, it is helpful to examine the environment in which it may be used. FIG. 2 is a block diagram of one embodiment of a network environment 200 utilizing a network device such as an NGSW 100. The environment comprises any number of client devices 202 connected to the NGSW via a network 204. A client device 202 ("client") is a computing device capable of making a request (e.g., for an object, service, etc.) over the network 204 and receiving a response for the request. For instance, the client 202 may be a personal computer (PC), a hand-held device or personal digital assistant (PDA) type device, a mobile phone, a tablet computer, etc. In one embodiment, the client is a PC running a web browser application and may make requests for objects over the network 204 by utilizing the web browser. Each client device is coupled to the NGSW using a client communication path that can include a dial-up connection, a LAN, a WAN, an IP network (such as an Internet, intranet, or extranet), or some combination thereof. As used herein, the terms "client" and "server" refer to relationships between the client or server and the NGSW, not necessarily to particular physical devices. As used herein, the term "client device" includes any device taking on the role of a client in a client-server environment. There is no particular requirement that the client devices 202 must be individual devices; they can each be a single device, a set of cooperating devices, a portion of a device, or some combination thereof.

The NGSW 100 is a computing device capable of receiving and responding to the request made by the client 202. In one embodiment, the NGSW 100 includes a cache with an internal object store housing objects that may be requested by the client 202. The NGSW is communicatively coupled to any of a number of content servers 206 via a network 208.

Networks 204 and 208 may be distinctly separate networks or the same (or portions of the same) network and may be any kind of networks known in the art. For instance, networks 204 and 208 may be private networks, such as intranets, extranets, local area networks (LANs), or wide area networks (WANs). Networks 204 and 208 may also be (in whole or in part) public networks, such as the Internet. Furthermore, many computer devices have multiple network interfaces and, thus, networks 204 and 206 may contain multiple upstream or downstream networks of wired and/or wireless segments. Nevertheless, in the interest of brevity, networks 204 and 208 will hereafter be referred to by the general term "network" to mean any kind of medium over which the client 202 and the NGSW 100 communicate.

Servers 206 provide content to the NGSW 100 and/or services to the clients 202. The servers 206 provide requested objects to the NGSW 100 when the NGSW 100 does not have the objects in its object store. The NGSW 100 has the ability to query any one of the plurality of servers 206 for the objects. Servers 206 are computer devices that can receive the query and respond in kind with the requested object(s). Each server device is coupled to the NGSW using a server communication path that can include a dial-up connection, a LAN, a WAN, an IP network or some combination thereof. In one embodiment, the server communication path includes an Internet backbone and an Internet connection between the NGSW and the Internet backbone. As used herein, the term "server device" includes any device taking on the role of a server in a client-server environment. There is no particular requirement that the server devices 206 must be individual devices; they can each be a single device, a set of cooperating devices, a portion of a device, or some combination thereof. Generally, a server device will include memory or storage for recording one or more web objects, which can be any type of data suitable for transmitting to the client device 202 (e.g., text, color, formatting and directions for display; pictures, data in graphical formats (such as GIF or JPEG), other multimedia data; animation, audio (such as streaming audio), movies, and video (such as streaming video), and other data in audio or visual formats (such as MPEG); program fragments, including applets, Java, JavaScript, and ActiveX; and other web documents and data types). In addition, the servers may provide application services to the clients, for example, mail services, social networking services, enterprise application services, etc.

Figure 3:
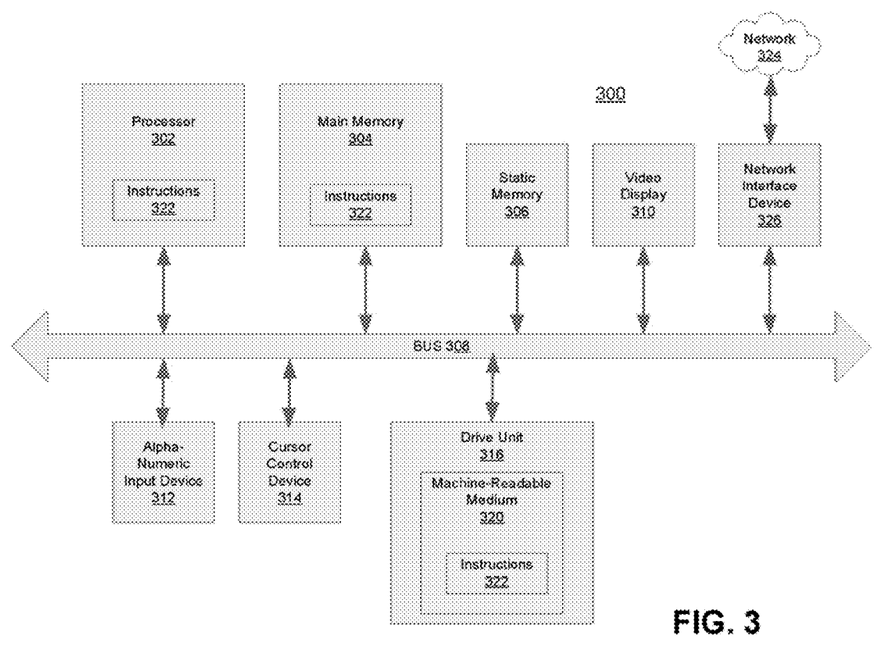
FIG. 3 illustrates an example of a computer system in which a set of instructions can be executed to cause the computer system to perform any one or more of the functions and processes discussed herein in accordance with an embodiment of the present invention.

The various computer-based devices discussed in connection with the present invention may share similar attributes. FIG. 3 illustrates an exemplary form of a computer system 300, in which a set of instructions can be executed to cause the computer system to perform any one or more of the functions and processes discussed herein. Computer system 300 may represent any or all of the clients, servers or NGSWs discussed herein. Further, while only a single machine is illustrated, the term "machine" should also be understood to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU), or both), a main memory 304 and a static memory 306, which communicate with each other via a bus 308. The computer system 300 may further include a display unit 310 (e.g., a liquid crystal display (LCD)). an alphanumeric input device 312 (e.g., a keyboard), a cursor control device 314 (e.g., a mouse, trackpad or joystick), a disk drive unit 316, and a network interface 318.

The disk drive unit 316 includes a machine-readable medium 320 on which is stored one or more sets of instructions (e.g., software 322) embodying any one or more of the methodologies or functions described herein. The software 322 may also reside, completely or at least partially, within the main memory 304 and/or within the processor 302 during execution thereof by the computer system 300, the main memory 304, and the instruction-storing portions of processor 302 also constituting machine-readable media. The software 322 may further be transmitted or received over a network 324 via the network interface 318.

While the machine-readable medium 320 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible or non-transitory medium that is capable of storing a set of instructions for execution by the machine and that cause the machine to perform any one or more of the methodologies of the present invention. The term "machine-readable medium" shall accordingly be taken to included, but not be limited to, solid-state memories, and optical and magnetic media.

Returning to FIG. 1, the NGSW 100 has on-box anti-virus and anti-malware (AV) scan engine 110, data leak prevention (DLP) engine 112, and authentication engine 114. The on-box AV engine 110 is closely integrated with the policy engine 102 so that traffic can be scanned for viruses and malware in real-time. The policy engine controls what types of traffic are subjected to virus scanning. Similarly, the policy engine controls the types of traffic that are subjected to DLP processing via DLP engine 112. The on-box authentication engine 114 associates traffic flows with specific users of a authentication realm.

In one embodiment of the invention, the AV engine 110 includes on-box dynamic real time rating (DRTR) services. This service may be supplemented (or in some cases replaced by) an off-box real time rating service 116. The DRTR capabilities enable the NGSW to categorize URLs and content in real-time. The categorized content and links can then be subject to policy control. For content and URLs that cannot be processed by the on-box DRTR, a cloud-based or other off-box DRTR service may be employed. The DRTR service allows for control of the level of AV scanning to be applied to traffic according to DRTR results. For example, traffic may be classified according to multiple dimensions, such as the web site, or type of site from which it originates (e.g., sports, news, pornography, social networking, etc.), URL rating associated with that source (e.g., as obtained from a third party URL rating service), and the tracing of dynamic links across multiple sites and categories. Consider for example a typical news site that provides embedded links or referrals to other sites which themselves may provide even further links to further sites. A static classification scheme may classify all traffic pulled through such a web site as "news" because in the static case it all originates from the link to the news site. However, the DRTR of the present NGSW tracks these dynamic links through to their respective origin sites and classifies the origin sites. Thus each traffic component may be handled in accordance with its respective origin site and AV scanning as appropriate provided.

Likewise, the data leak protection engine 112 may provide data leak protection according to past user histories, as logged by the NGSW 100. Histories of user sessions may be maintained and analyzed by the data leak protection engine to inform and control future levels of data leak scrutiny to be given to connections initiated by or directed to the various users in accordance with these analyses. This kind of granular control over data leak protection and AV scanning is important in enforcing associated policies for an enterprise or other network.

The on-box authentication engine 114 is configured to associate individual users with traffic requests. For example, logs of user identification, user IP address, content type requested, times of accesses, etc. may be kept and used to enforce or revise policies for accesses within and outside of an enterprise network.

Figure 4:
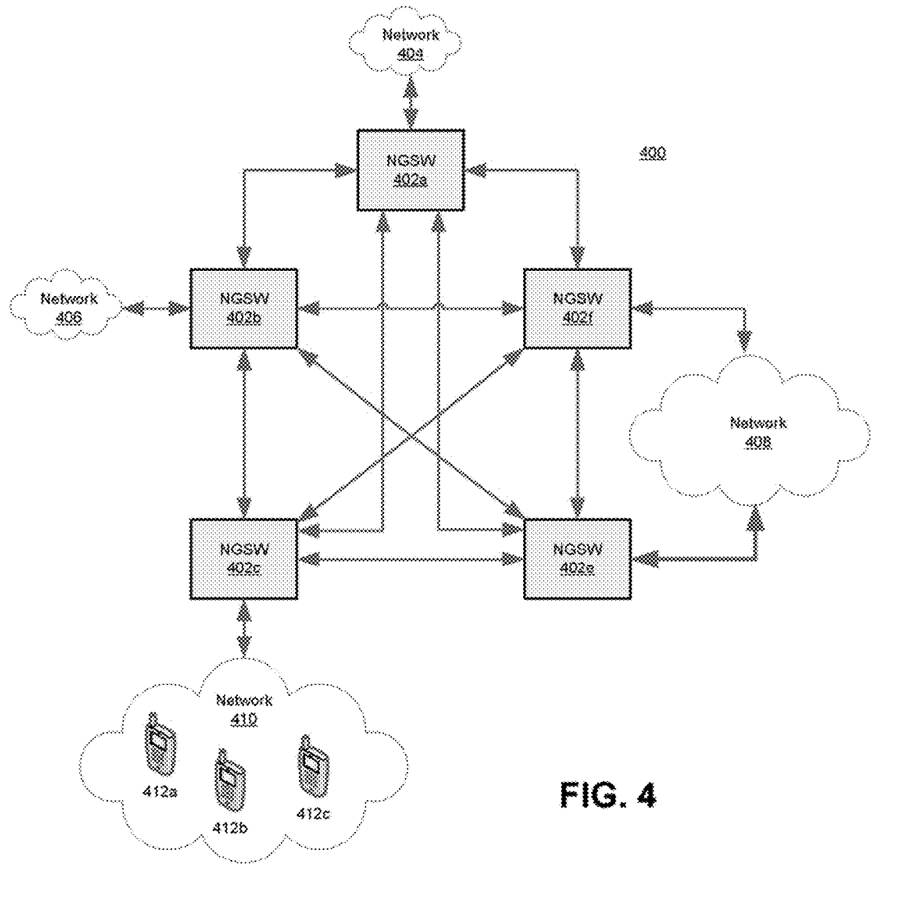
FIG. 4 illustrates an NGSW cluster configured in accordance with yet a further embodiment of the present invention.

As indicated above, individual NGSWs may be networked together in full mesh connectivity to construct an NGSW cluster. As shown in FIG. 1, each NGSW includes a cluster controller 118, which is configured to oversee the NGSWs participation in an NGSW cluster. Each member NGSW can be located in different geographical or logical locations. For example, one NGSW may be located in or responsible for a network in New York while another NGSW member may be located in or responsible for a network in San Francisco. The transmission delay between any two NGSW members can be up to 120 milliseconds. This NGSW cluster concept is illustrated in FIG. 4.

The NGSW cluster 400 includes individual NGSWs 402*a*-402*f* and uses a full-mesh architecture to connect all of the members of the cluster. Between any two NGSW members there exists a secure communication channel where all exchanges take place. Information that is exchanged among the peer NGSW members includes, for example, identifications of processed traffic flows, system resource utilization levels, application recognition capabilities, anti-virus database version information and DLP signature database information. By exchanging information with other cluster peers, an NGSW may request a peer to handle certain types of traffic on its behalf. In this way, network traffic received at one of the peered network security appliances may be processed in accordance with traffic flow policies received from another of the peered network security appliances.

Each individual NGSW of the cluster is responsible for its associated enterprise or other network. For example, NGSW 402*a* is responsible for a network 404 in New York, NGSW 402*b* is responsible for a network 406 in Chicago, and NGSWs 402*e* and 402*f* are responsible for respective segments of a network 408 in San Francisco. NGSW 402*c* is illustrated as being responsible for a mobile network 410, which may provide connectivity for mobile devices 412*a*-412*c*.

Clustering NGSWs in this fashion allows individual NGSWs to offload processing of asymmetrically routed traffic flows to peer NGSWs that have already observed traffic associated with the flow in one direction. Further, traffic may be off-loaded based on characteristics such as time-of-day, resource availability or other network administrator-defined policies. To facilitate such decision making, the peer NGSWs may exchange information relating to traffic flows being handled, actions taken in response to same, state updates and cluster membership updates. Current traffic flow information may include those being processed or bypassed. Resource utilization information may include items such as user limits, processor utilization and memory utilization. Ideally, such information is transferred within the cluster in the form of announcements by individual NGSWs, and those announcements may also include items such as application recognition information (e.g., the number of applications and inspection depths for each), and AV signature and DLP databases information.

In some instances, where caches are included in the NGSWs, individual NGSWs may also broadcast their stored contents, or portions thereof, to other NGSWs. Such content is known to be safe (having already been scanned for viruses and malware before being stored by an individual NGSW), and therefore may make an appropriate source for another of the NGSWs to obtain same. This can be beneficial where NGSWs in different time zones may exchange content items before expect peak load periods. In addition, NGSWs may exchange dynamically rated URLs, newly discovered malicious attacks, or other items of interest, thereby avoiding the need for peer NGSWs to have to wait for updates from other sources. In some instances, those NGSWs with special capabilities can broadcast same and peer devices can off-load client requests that require such capabilities to the appropriate devices for processing.

Clustered NGSWs may also form the basis for cloud-based NGSW services. While not all cloud-based instantiations of NGSW services require such a cluster, the cluster arrangement does provide a convenient means of deploying such services. By offering NGSW services in a cloud-based fashion, small enterprises are spared the need to purchase and maintain individual appliances. Alternatively, or in addition, individual NGSWs may be configured to interoperate with cloud-based services to coordinate the handling of various traffic and requests.

Returning briefly to FIG. 1, the policy engine 102 may be configured to communicate with a cloud service controller 120. This, the NGSW 100 acts as a connector from a site such as an enterprise or other network to the cloud. This is further illustrated in FIG. 5. The NGSW 502 operates at the boundary 504 of its network and is communicatively coupled to the cloud-based service offering 500 via a network 506. Within the cloud, a load balancer 508 may be responsible for distributing requests for cloud-based service among multiple appliances 510, various ones of which may be configured to provide specified services. In some cases, the cloud-based services may be based on heterogeneous service platforms, each of which is configured to offer identical services, but this need not necessarily be true.

Figure 5:
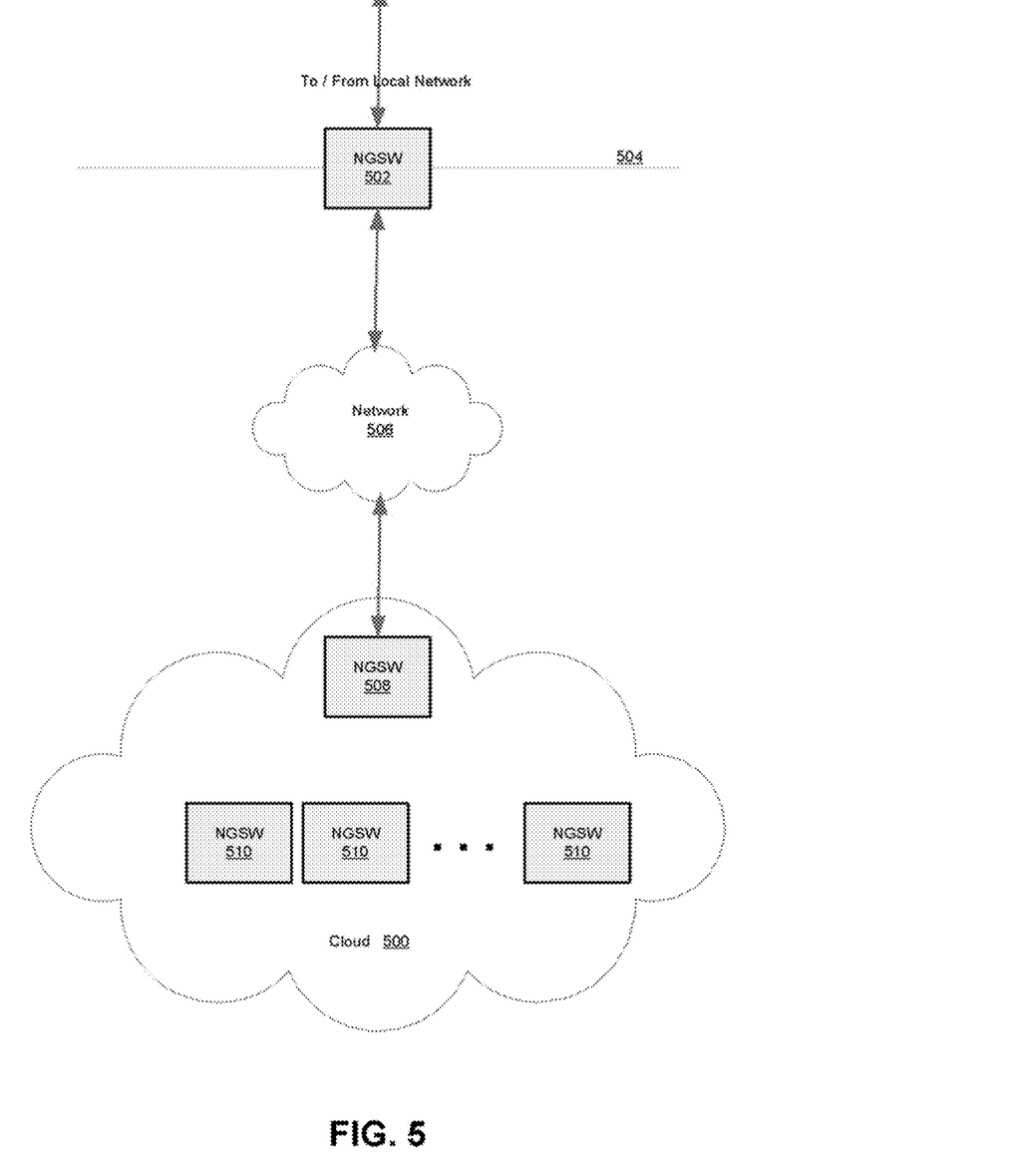
FIG. 5 illustrates clustered NGSWs which form the basis for cloud-based NGSW services in accordance with an embodiment of the present invention.

Among the services that may be offered by the cloud-based NGSWs are data loss protection, anti-virus/anti-malware scanning and policy enforcement, dynamic real time rating of URLs and the like, security services, network acceleration (e.g., using byte caching between NGSWs at ends of a communication link), and other policy based services as described herein. In some embodiments, all traffic may initially be directed from NGSW 502 into the cloud 500. Once the traffic has been processed, the NGSW 502 may be dynamically updated by the cloud with revised security and access policies, such that, for example, some later traffic will be directed to the cloud, some traffic will go directly to the Internet, and other traffic may be restricted. The NGSW 502 may retain control over local decisions affecting traffic distributed within its network.

Figure 6:
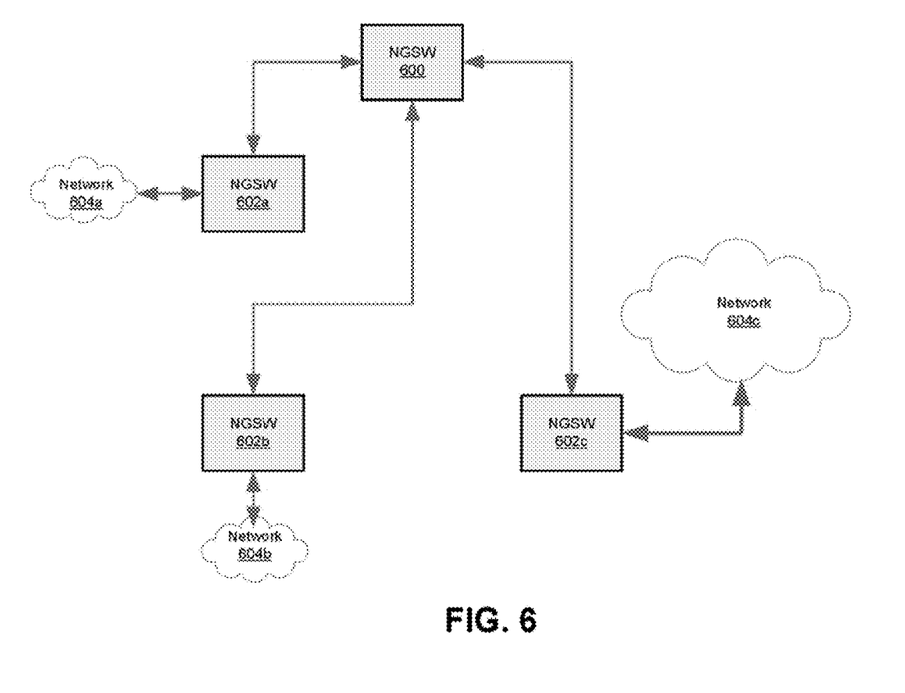
FIG. 6 illustrates NGSW appliances deployed within or associated with individual networks or segments thereof and acting as intrusion detection sensors for their respective networks or segments in accordance with embodiments of the present invention.

As illustrated in FIG. 6, NGSW appliances 602a-602c deployed within or associated with individual networks or segments thereof 604a-604c may act as intrusion detection sensors for their respective networks or segments. As such, each NGSW sensor may report to a central NGSW controller 600, which can then compute an overall threat map for an entire network (made up of multiple segments) or network of networks. Based on this assessment, the controller NGSW can determine a set of active defenses for the network(s) that are translated to a set of dynamic polices. These policies can then be published to the individual NGSWs 602a-602c for installation and execution in real time. This is also shown in FIG. 1 as the intrusion detection system/intrusion prevention system (IDS/IPS) controller update 122. Thus the defenses can be implemented at the individual appliance level.

Thus, systems and methods which integrate firewall and UTM infrastructures with application proxy technology to provide a unified solution for IPv4 and IPv6 environments have been described. In the foregoing discussion the present invention has been described with reference to certain embodiments and illustrated examples. However, it should be remembered that these examples are not intended to limit the present invention but instead were provided merely to illustrate certain features of the present invention. Hence, the invention should be measured only in terms of the claims, which follow this description Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

Further, the algorithms and symbolic representations of operations on data within a computer memory described herein are so used because they are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described herein, including switches, routers, firewalls, network PCs, servers, and the like.

What is claimed is:

1. A security gateway, comprising a memory and a computer processing unit communicatively coupled to the memory wherein the memory stores computer-executable instructions which, when executed by the processing unit, cause the processing unit to:
    log, by the computer processing unit, user access histories associated with the security gateway;
    analyze, by the computer processing unit, the logged user access histories;
    determine, by the computer processing unit, a level of data loss scrutiny according to the analysis of the logged user access histories;
    apply, by the computer processing unit, the determined level of data loss prevention scrutiny to network traffic received at the security gateway;
    evaluate, by the computer processing unit, network traffic according to a dynamic real time rating scheme that provides categorization of content represented in the network traffic, wherein the dynamic real time rating scheme is provided by a real time rating service that is external to the security gateway when the security gateway is unable to process the content;
    update, dynamically by the computer processing unit, a firewall engine in accordance with a new traffic classification based on the evaluation of the network traffic;
    determine, by the computer processing unit, a level of anti-virus, anti-malware scanning to the network traffic based on results of the dynamic real time rating; and
    apply, by the computer processing unit, the determined level of anti-virus, anti-malware scanning to the network traffic.

2. The security gateway in claim 1, wherein the instructions, when executed by the computer processing unit, communicate the dynamic real time rating to a second security gateway.

3. The security gateway in claim 1, wherein the instructions, when executed by the computer processing unit:
    discover a malicious attack; and
    communicate information pertaining to the malicious attack to a second security gateway.

4. The security gateway in claim 1, wherein the instructions, when executed by the computer processing unit, perform network acceleration by byte caching information with a second security gateway.

5. A method, comprising:
    logging, by a computer processor, user access histories associated with a security gateway;
    analyzing, by the computer processor, the logged user access histories;
    determining, by the computer processor, a level of data loss scrutiny according to the analysis of the logged user access histories;
    applying, by the computer processor, the determined level of data loss prevention scrutiny to network traffic received at the security gateway;
    evaluating, by the computer processor, the network traffic according to a dynamic real time rating scheme that provides categorization of content represented in the network traffic, wherein the dynamic real time rating scheme is provided by a real time rating service that is external to the security gateway when the security gateway is unable to process the content;
    updating, dynamically by the computer processor, a firewall engine in accordance with a new traffic classification based on the evaluation of the network traffic;
    determining, by the computer processor, a level of anti-virus, anti-malware scanning to the network traffic based on results of the dynamic real time rating; and
    applying the determined level of anti-virus, anti-malware scanning to the network traffic.

6. The method of claim 5, further comprising communicating the dynamic real time rating to a second security gateway.

7. The method of claim 5, further comprising:
    discovering a malicious attack; and
    communicating information pertaining to the malicious attack to a second security gateway.

8. The method of claim 5, further comprising performing network acceleration by byte caching information with a second security gateway.

9. A security gateway, comprising a memory and a computer processing unit communicatively coupled to the memory wherein the memory stores computer-executable instructions which, when executed by the processing unit, cause the processing unit to:
    log, by the computer processing unit, user access histories associated with the security gateway;
    analyze, by the computer processing unit, the logged user access histories;
    determine, by the computer processing unit, a level of data loss scrutiny according to the analysis of the logged user access histories;
    apply, by the computer processing unit, the determined level of data loss prevention scrutiny to network traffic received at the security gateway;
    evaluate, by the computer processing unit, the network traffic according to a dynamic real time rating scheme that provides categorization of content represented in the network traffic;
    update, dynamically by the computer processing unit, a firewall engine in accordance with a new traffic classification based on the evaluation of the network traffic;
    determine, by the computer processing unit, a level of anti-virus, anti-malware scanning to the network traffic based on results of the dynamic real time rating;
    apply the determined level of anti-virus, anti-malware scanning to the network traffic; and
    perform network acceleration by byte caching the network traffic to a second security gateway.

10. A method, comprising:
    logging, by a computer processor, user access histories associated with a security gateway;
    analyzing, by the computer processor, the logged user access histories;

determining, by the computer processor, a level of data loss scrutiny according to the analysis of the logged user access histories;

applying, by the computer processor, the determined level of data loss prevention scrutiny to network traffic received at the security gateway;

evaluating, by the computer processor, the network traffic according to a dynamic real time rating scheme that provides categorization of content represented in the network traffic;

updating, dynamically by the computer processor, a firewall engine in accordance with a new traffic classification based on the evaluation of the network traffic;

determining, by the computer processor, a level of anti-virus, anti-malware scanning to the network traffic based on results of the dynamic real time rating;

applying the determined level of anti-virus, anti-malware scanning to the network traffic; and performing network acceleration by byte caching the network traffic to a second security gateway.

* * * * *